US012084139B2

(12) United States Patent
Jones

(10) Patent No.: US 12,084,139 B2
(45) Date of Patent: Sep. 10, 2024

(54) BIKE RACK TRAILER FOR TRANSPORTING BICYCLES OR OTHER CARGO

(71) Applicant: Matthew D. Jones, Southfield, MI (US)

(72) Inventor: Matthew D. Jones, Southfield, MI (US)

( * ) Notice: Subject to any disclaimer, the term of this patent is extended or adjusted under 35 U.S.C. 154(b) by 815 days.

(21) Appl. No.: 17/264,817

(22) PCT Filed: Jul. 31, 2019

(86) PCT No.: PCT/IB2019/056551
§ 371 (c)(1),
(2) Date: Jan. 31, 2021

(87) PCT Pub. No.: WO2020/026177
PCT Pub. Date: Feb. 6, 2020

(65) Prior Publication Data
US 2021/0229767 A1 Jul. 29, 2021

Related U.S. Application Data

(60) Provisional application No. 62/713,036, filed on Aug. 1, 2018.

(51) Int. Cl.
B62D 63/06 (2006.01)
B60D 1/00 (2006.01)
(Continued)

(52) U.S. Cl.
CPC ............ B62D 63/061 (2013.01); *B60D 1/56* (2013.01); *B60P 3/07* (2013.01);
(Continued)

(58) Field of Classification Search
CPC ...... B62D 63/061; B62D 63/064; B60D 1/56; B60D 1/065; B60D 1/52; B60D 2001/003; B60D 2001/005; B60P 3/07; B62H 3/12
See application file for complete search history.

(56) References Cited

U.S. PATENT DOCUMENTS 2,461,577 A * 2/1949 Stark, Jr. .............. B62D 53/067
280/30
3,941,406 A * 3/1976 Eggleston ................ B60P 3/07
211/8
(Continued)

FOREIGN PATENT DOCUMENTS

CA      2494032 C  *  2/2011  ............. B60D 1/485
CH      699868 A2  *  5/2010  ............... B60P 3/07
(Continued)

OTHER PUBLICATIONS

Translated FR-2971224-A1 (Year: 2024).*
(Continued)

*Primary Examiner* — James A Shriver, II
*Assistant Examiner* — Ian Bryce Shelton

(57) ABSTRACT

The present invention contemplates an apparatus for, and methods of, conveniently transporting cargo by holding cargo securely in a way using a transport apparatus that can be coupled to a vehicle, for easy and convenient transport of the cargo. The invention contemplates a transport apparatus that is capable of horizontal, vertical, telescoping, and/or rotational collapse and/or expansion. The invention contemplates wheels on a collapsed transport apparatus that make moving from place to place very convenient, whether the transport apparatus is expanded or collapsed. Embodiments can be used to secure and transport cargo such as bicycles. Embodiments of the invention allow coupling of a transport apparatus to a vehicle by use of a standard ball joint and/or trailer hitch. Other embodiments could comprise a trailer connection attachment, which can be used to couple a transport apparatus to a vehicle in cases where the vehicle lacks its own trailer hitch.

20 Claims, 11 Drawing Sheets

(51) Int. Cl.
*B60D 1/06* (2006.01)
*B60D 1/52* (2006.01)
*B60D 1/56* (2006.01)
*B60P 3/07* (2006.01)
*B62H 3/12* (2006.01)

(52) U.S. Cl.
CPC ........ *B60D 2001/003* (2013.01); *B60D 1/065* (2013.01); *B60D 1/52* (2013.01); *B62D 63/064* (2013.01); *B62H 3/12* (2013.01)

(56) References Cited

U.S. PATENT DOCUMENTS

| | | | | |
|---|---|---|---|---|
| 4,116,341 A * | 9/1978 | Hebda | ................ | B60R 9/06 224/532 |
| 4,671,530 A * | 6/1987 | van der Wouden | . | B62D 63/061 280/652 |
| 4,813,550 A * | 3/1989 | Saeks | ................ | B62H 3/12 211/208 |
| 5,690,260 A * | 11/1997 | Aikins | ................ | B60R 9/10 224/532 |
| 5,941,542 A * | 8/1999 | Kalman | ................ | B60P 3/07 211/20 |
| 6,164,683 A * | 12/2000 | Kalman | ................ | B60P 3/07 296/181.7 |
| 7,097,182 B1 * | 8/2006 | Liu | ................ | B62B 3/02 280/42 |
| 7,243,966 B1 * | 7/2007 | Sheldon | ................ | B60P 3/40 410/32 |
| 7,651,117 B1 * | 1/2010 | McGee | ................ | B62D 63/062 280/639 |
| 9,376,063 B2 * | 6/2016 | Hein | ................ | B60R 9/06 |
| 9,555,744 B1 * | 1/2017 | Roth | ................ | B60R 9/06 |
| 9,802,549 B1 * | 10/2017 | Shen | ................ | B60R 9/10 |
| 10,035,472 B1 * | 7/2018 | Turner | ................ | A47B 3/10 |
| 10,160,112 B2 * | 12/2018 | Hirokawa | ................ | B60R 9/06 |
| 10,501,023 B1 * | 12/2019 | Mayers | ................ | B60R 9/10 |
| 2003/0062707 A1 * | 4/2003 | Koch | ................ | B62D 63/061 280/401 |
| 2003/0155748 A1 * | 8/2003 | Picard | ................ | B62D 21/20 280/656 |
| 2007/0267846 A1 * | 11/2007 | Carraway | ................ | B60D 1/56 280/495 |
| 2009/0224512 A1 * | 9/2009 | Winter | ................ | B60D 1/143 280/639 |
| 2012/0043286 A1 * | 2/2012 | Noyes | ................ | B60R 9/10 248/340 |
| 2013/0038038 A1 * | 2/2013 | Bernard | ................ | B62D 63/061 280/415.1 |
| 2013/0270201 A1 | 10/2013 | Vineyard | | |
| 2017/0274830 A1 * | 9/2017 | Cox | ................ | B60R 9/10 |
| 2017/0334361 A1 * | 11/2017 | Jones | ................ | B60R 9/06 |
| 2018/0050645 A1 * | 2/2018 | Phillips | ................ | B60R 9/06 |
| 2019/0016271 A1 * | 1/2019 | Garceau | ................ | B60R 9/06 |

FOREIGN PATENT DOCUMENTS

| | | | | |
|---|---|---|---|---|
| DE | 102009017925 A1 * | 11/2010 | ........ | B62D 63/061 |
| DE | 102011012904 A1 | 9/2012 | | |
| EP | 0157659 A2 * | 10/1985 | | |
| EP | 0659958 B1 | 6/1995 | | |
| FR | 2544674 A1 * | 10/1984 | | |
| FR | 2642378 A1 * | 8/1990 | | |
| FR | 2971224 A1 * | 8/2012 | ........ | A61G 3/0808 |
| GB | 2116488 A * | 9/1983 | ........ | B62D 63/061 |
| GB | 2310834 A * | 9/1997 | ........ | B60P 3/06 |
| GB | 2325198 A * | 11/1998 | ........ | B62D 63/064 |
| KR | 101655687 B1 * | 9/2016 | | |
| KR | 20160150413 A * | 12/2016 | | |
| KR | 101859901 B1 * | 6/2018 | | |
| WO | WO-2012015780 A1 * | 2/2012 | ........ | B60R 9/06 |

OTHER PUBLICATIONS

GO Easy Adventure Utility Trailers_SylvanSport, Apr. 6, 2017, https://web.archive.org/web/20170406173654/https://www.sylvansport.co.nz/go-easy/.

Rola 59401 TX-104 4 Bike Tilting Carrier, Apr. 12, 2016, https://web.archive.org/web/20160412205757/https://www.rvupgradestore.com/Rola-4-Bike-Folding-Carrier-p/92-1517.htm.

Malone MicroSport Kayak Trailer Kit—2 Kayak Package 461GS—rackboys.com—Product Details, Aug. 26, 2017, https://web.archive.org/web/20170826124944/http://rackboys.com/products/2747/Malone-MicroSport-Kayak-Trailer-Kit-2-Kayak-Package-461GS.html.

* cited by examiner

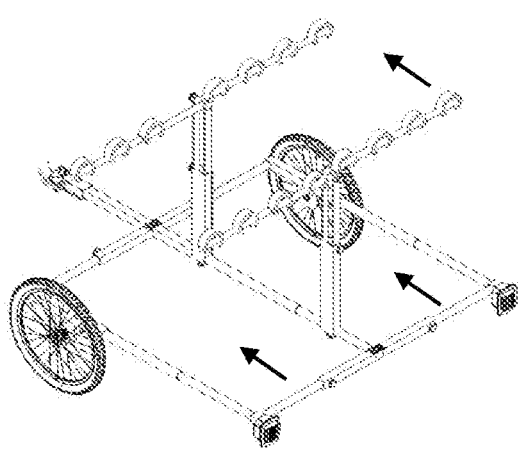
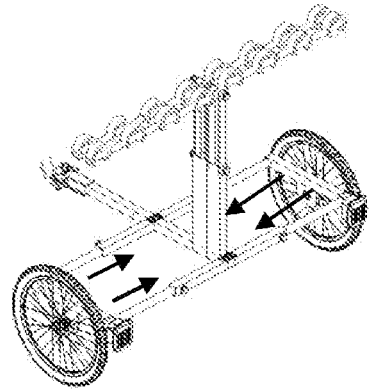
FIG. 3A
FIG. 3B
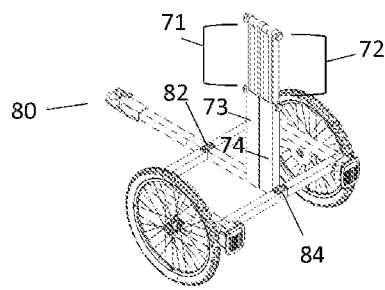
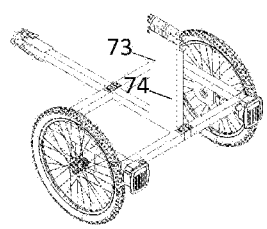
FIG. 3C
FIG. 3D

BIKE RACK TRAILER FOR TRANSPORTING BICYCLES OR OTHER CARGO

The present nonprovisional application claims priority from PCT International Application number PCT/IB2019/056551, filed on Jul. 31, 2019 and claiming priority from U.S. Provisional Application No. 62/713,036, filed on Aug. 1, 2018.

STATEMENT REGARDING FEDERALLY SPONSORED RESEARCH

Not applicable.

BACKGROUND OF THE INVENTION

1. Field of the Invention

The present invention relates to an apparatus for, and methods of, holding cargo securely in a way that allows for coupling to a vehicle for easy and convenient transport of the cargo. Embodiments of the invention can be used to secure and transport cargo such as bicycles by securing the apparatus to a vehicle such as a car or truck, and securing one or more bicycles to the apparatus.

2. Description of the Related Art

Several devices presently exist for attaching bicycles to motor vehicles. What many such devices lack, however, are cargo-holding components attached to a frame that is adapted for collapse, allowing convenient storage of the device when it is not being used. Additionally, many such devices lack adaptations such as wheels which would allow the devices to be easily moved from place to place, and/or which could allow the device to bear weight of both itself and its cargo on the ground rather than placing the full strain of their weight on an attached vehicle.

As such, it can be substantially convenient to have a device capable of transporting cargo such as bicycles from place to place by being reversibly attached to a vehicle such as a car or truck, where the cargo-holding components of this device are mounted on a frame that is capable of physical expansion and collapse, and where the device comprises wheels which allow it to be moved easily when collapsed and not in use.

SUMMARY OF THE INVENTION

Briefly described, the invention comprises apparatuses for and methods of securely holding and transporting cargo such as bicycles while being attached to vehicles such as cars, trucks, or other motor vehicles.

Advantages of the present invention might include the use of a collapsible and/or expandable frame, which makes a device's functional components available for use in an expanded configuration, and which also allows the device to be collapsed into a compact, collapsed configuration when not in use.

Another advantage of the present invention might include the use of wheel components of an apparatus, which can allow the apparatus to roll along the ground while being pushed or pulled by a vehicle or by a person. When being pulled by a vehicle, these wheel components allow the ground to help support the weight of the apparatus and of cargo being transported. When being pulled by a person, these wheel components allow the apparatus to be conveniently moved from place to place without having to be lifted and carried.

Additional advantages of the present invention include features of a transport apparatus which allow reversible attachment to a vehicle, which can greatly facilitate convenient transport of cargo. One example of such features could include a hitching element, such as a standard ball joint, for attaching to a trailer hitch on a vehicle. Other examples of such features could include a trailer connection attachment, which can be secured to the transport apparatus on one end and a vehicle on the other end; elements of this trailer connection attachment might include extensions such as straps which are adapted to be placed in an open door, rear hatch, or trunk of a vehicle, and which are secured by closing the door, rear hatch or trunk. A trailer connection attachment can be used in cases where a vehicle does not have its own trailer hitch.

The embodiments and descriptions disclosed in this specification are contemplated as being usable separately, and/or in combination with one another.

In some embodiments, a transport apparatus comprises one or more cargo holding beams.

In some embodiments, one or more cargo holding beams are collapsible and/or expandable.

In some embodiments, one or more cargo holding beams have a telescoped construction which allows them to be shortened and/or lengthened.

In some embodiments, the cargo holding beams are adapted to interface with one or more cargo securing units.

In some embodiments, the cargo securing units comprise one or more slidable elements which can be placed on and/or removed from the cargo holding beams.

In some embodiments, the slidable elements comprise one or more upper space holders, which are adapted to secure cargo in between an inner surface of the upper space holder and an outer surface of a cargo holding beam.

In some embodiments, the one or more upper space holders comprise an arc shape.

In some embodiments, the slidable elements comprise strap holders, which in turn comprise strap elements which are securable around cargo.

In some embodiments, a transport apparatus is adapted for collapsing into a smaller size and expanding into a larger size.

In some embodiments, collapsing and expanding the transport apparatus is accomplished with one or more telescoping horizontal elements.

In some embodiments, collapsing and expanding the transport apparatus is accomplished with one or more telescoping vertical elements.

In some embodiments, one or more telescoping vertical elements can comprise hollow sections which are adapted to hold one or more cargo holding beams after said cargo holding beams have been rotated into a vertical position.

In some embodiments, one or more cargo holding beams can be rotated between a horizontal position and a vertical position.

In some embodiments, a hinge connects one or more cargo holding beams to a telescoping vertical element.

In some embodiments, one or more telescoping vertical elements can comprise an upper telescoping element which is adapted to slide into and out of a lower telescoping element.

In some embodiments, a hollow section in said upper telescoping element is adapted to contain one or more cargo support beams, and a hollow section in said lower telescoping element is adapted to contain both the upper telescoping element and one or more cargo support beams which have been positioned within the upper telescoping element.

In some embodiments, a transport apparatus can be collapsed and/or expanded by rotation of horizontal elements and/or vertical elements between perpendicular configurations and parallel configurations.

In some embodiments, the transport apparatus comprises one or more locking mechanisms, which are adapted to retain the transport apparatus in an expanded configuration and/or in a collapsed configuration.

In some embodiments, the transport apparatus comprises wheels.

In some embodiments, the wheels can be positioned to allow rolling when said transport apparatus is in an expanded and/or a collapsed configuration.

In some embodiments, the wheels are adapted to be removable and/or separable from the transport apparatus.

In some embodiments, a transport apparatus comprises a hitching element.

In some embodiments, the hitching element comprises a standard ball joint.

In some embodiments, a trailer connection attachment is adapted to connect a transport apparatus to a vehicle.

In some embodiments, the trailer connection attachment comprises extensions and a hitching element.

In some embodiments, the extensions of the trailer connection attachment comprise straps, strings or cords.

In some embodiments, the extensions on the trailer connection attachment are adapted to fit into an open vehicle door and/or trunk, and are adapted to be held in place when the vehicle door and/or trunk are closed.

In some embodiments, the extensions on the trailer connection attachment comprise edge adaptations that are adapted to surround, or to otherwise be secured to, edges of a vehicle door and/or trunk.

In some embodiments, the edge adaptations comprise end hooks.

In some embodiments, the trailer connection attachment comprises a bumper interfacing element which is adapted to interface with a vehicle bumper.

In some embodiments, the trailer connection attachment comprises a bumper hook which is adapted to interface with a bottom section of a vehicle bumper.

A method embodiment of the present invention configures a transport apparatus into a collapsed configuration, comprising the steps of: rotating one or more cargo holding beams into an orientation which is parallel to one or more beam-holding elements; and sliding one or more cargo holding beams into a hollow section of one or more beam-holding elements.

Some method embodiments comprise the additional step of: collapsing a frame of a transport apparatus by sliding one or more frame elements past each other.

Some method embodiments comprise the additional step of: collapsing a frame of a transport apparatus by rotating one or more frame elements.

In some method embodiments, beam-holding elements and frame elements are oriented in perpendicular directions with respect to each other.

In some method embodiments, beam-holding elements and frame elements are oriented in parallel directions with respect to each other.

In some method embodiments, beam-holding elements are collapsible through use of a telescoping mechanism.

An additional method embodiment of the present invention secures a trailer connection attachment to a vehicle, comprising the steps of: partially inserting strap components of a trailer connection attachment into a vehicle opening; and closing the vehicle opening.

In some method embodiments, the strap components comprise end hooks which are adapted to interface with edges of a vehicle door, hatch, and/or trunk.

BRIEF DESCRIPTION OF THE DRAWINGS

FIGS. 3A through 3F show an embodiment of the invention and depict how the invention can be shortened and collapsed.

DETAILED DESCRIPTION OF THE INVENTION

Figure 1A:
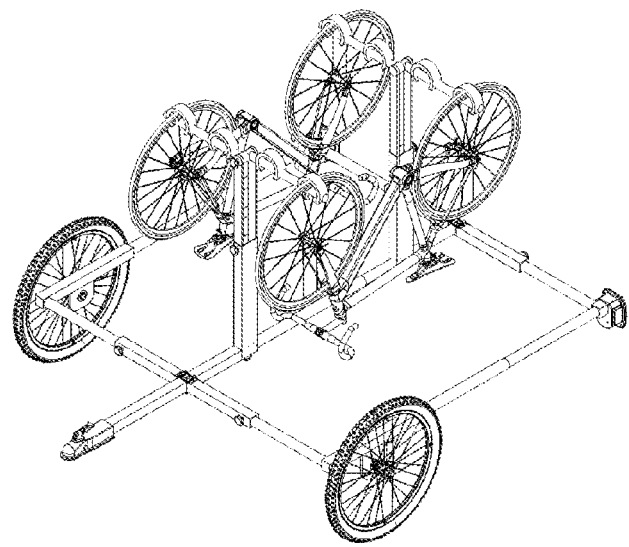
FIGS. 1A and 1B show embodiments of the invention which are adapted to securely hold multiple bicycles.

The following detailed description of the invention refers to the accompanying figures. The description and drawings do not limit the invention; they are meant only to be illustrative of example embodiments. Other embodiments are also contemplated without departing from the spirit and scope of the invention.

Referring now to the drawings, embodiments of the invention are shown and disclosed.

FIG. 1A shows an example embodiment of the invention, which comprises a device that is adapted to hold four bicycles. In this view, the device is in an expanded configuration, and is holding two bicycles.

Figure 1B:
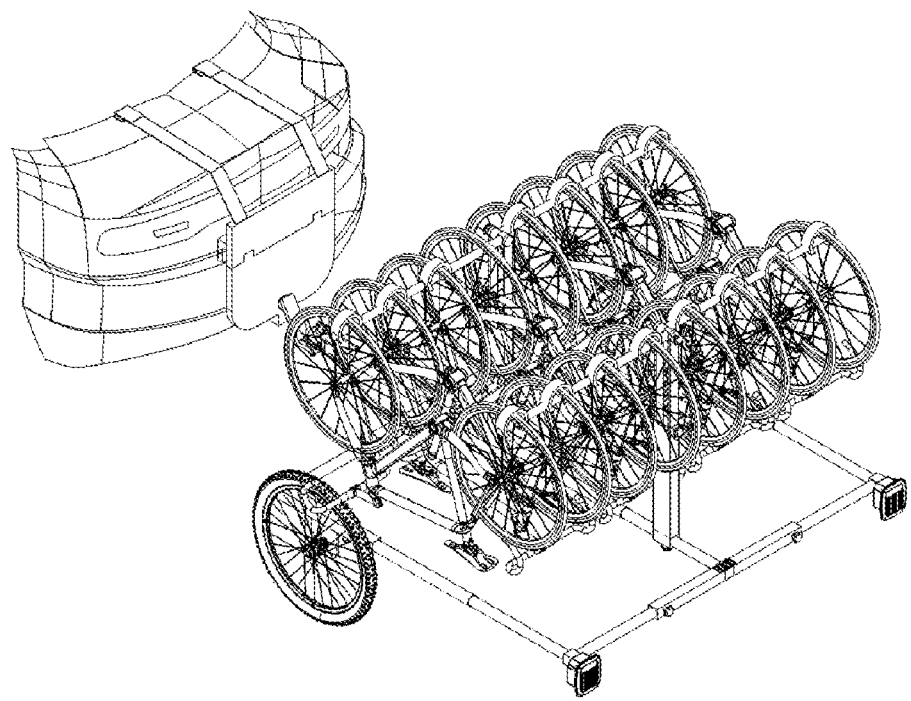

FIG. 1B shows another example embodiment of the invention, which comprises a device that is adapted to hold eight bicycles. In this view, the device is in an expanded configuration, and is holding eight bicycles. Also in this view, the device has been coupled to a trailer connection attachment, which in turn is attached to the back of a vehicle.

Figure 2:
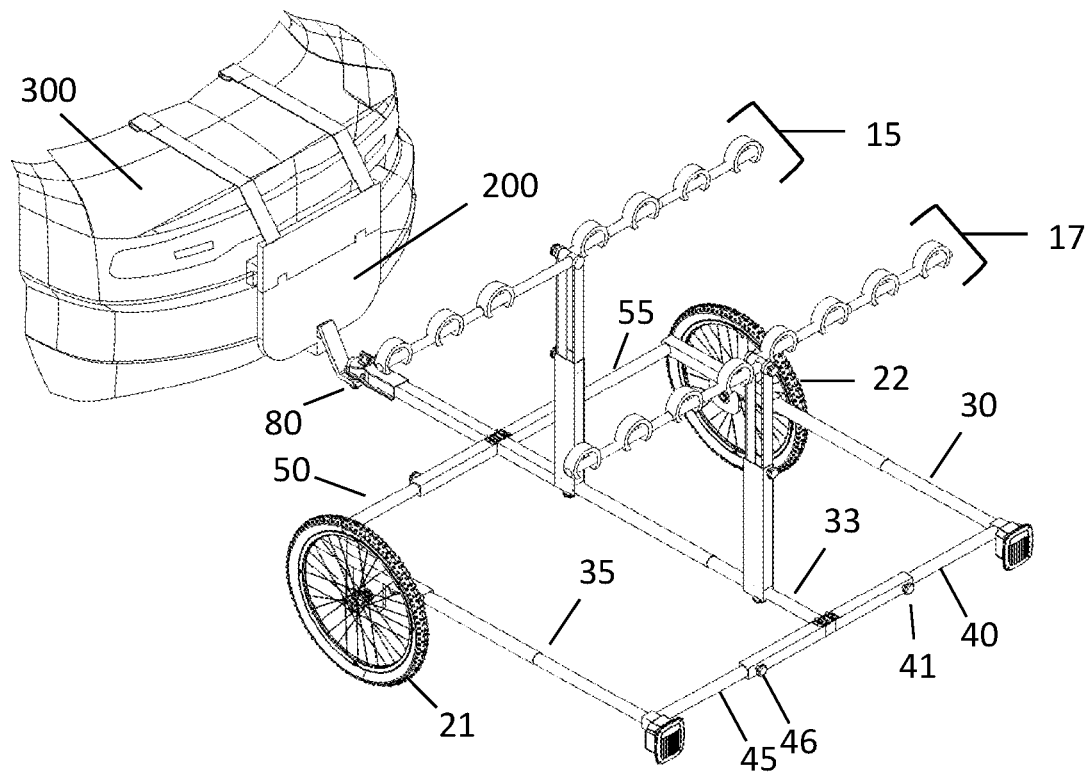
FIG. 2 shows an embodiment of the invention which is coupled to a back section of a vehicle.

FIG. 2 shows the device from FIG. 1B with the eight bicycles removed, allowing visibility of components of a transport apparatus 10. These elements include front stanchions 15, rear stanchions 17, left wheel 21, right wheel 22, right telescoping member 30, middle telescoping member 33, left telescoping member 35, right rear telescoping member 40, left rear telescoping member 45, left front telescoping member 50, right front telescoping member 55, restraining locks 41, 46, and 60 (see also FIG. 3F), and a hitching element 80 which can comprise a standard ball joint. Also in this view, the device is coupled to a trailer connection attachment 200, which in turn is coupled to a vehicle 300.

FIG. 3A shows the device from FIG. 1B and FIG. 2 in an expanded configuration. In this view, arrows indicate the direction in which the device can be partially collapsed through telescoping action.

FIG. 3B shows the device from FIGS. 1B, 2, and 3A in a partially collapsed configuration. In this view, arrows indicate the direction in which the device can be further collapsed through telescoping action.

FIG. 3C shows the device from FIGS. 1B, 2, 3A, and 3B in a further collapsed configuration. Note that in this view, front and rear stanchions 15 and 17 have been rendered invisible in order to provide more convenient viewing of some of the device's other components. This view provides easy visibility of hitching element 80, as well as a front pivot joint 82 and rear pivot joint 84, where these pivot joints can comprise hinges that allow rotational collapse of the device. The device comprises upper vertical elements 71 and 72, which are movable through telescoping action into and out of lower vertical elements 73 and 74. Also, upper vertical elements 71 and 72 comprise hollow sections which are adapted to accommodate front and rear stanchions 15 and 17, as will be shown in subsequent figures.

Figure 3E:
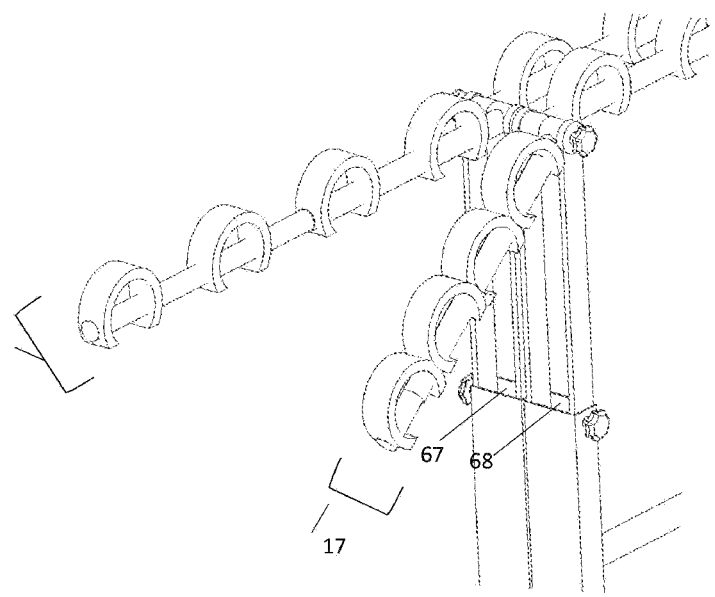

FIG. 3D shows the device from FIGS. 1B, 2, 3A, 3B, and 3C in a vertically collapsed configuration. In this view, upper vertical elements 71 and 72, as well as front and rear stanchions 15 and 17 which have been rotated and contained within the upper vertical elements 71 and 72 (see FIG. 3E), have been slid into empty sections of lower vertical elements 73 and 74.

FIG. 3E shows a zoomed-in view of the device which depicts empty spaces 67 and 68, into which front and rear stanchions 15 and 17 can be rotated and positioned, after which upper vertical elements 71 and 72 can be telescopically moved into lower vertical elements 73 and 74 (see previous figures).

Figure 3F:
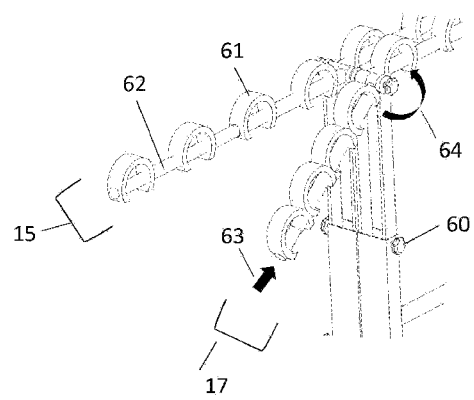

FIG. 3F shows a zoomed-in view of the device which depicts space holders 61 which, in this embodiment, comprise two holes apiece, and which can be slid in both directions along cargo support element 62. (Note that the space holders 61 depicted in this embodiment comprise an arc shape, allowing them to surround cargo on multiple sides.) Cargo such as bicycles can be secured to the device by placing an upper space holder around a top surface of the cargo, sliding cargo support element 62 through one hole of space holder 61, sliding cargo support element 62 under a bottom surface of the cargo, and finally sliding cargo support element 62 through another hole in space holder 62. In this way, the cargo ends up with its bottom surface hanging on cargo support element 62, and its top surface and side surfaces surrounded by space holder 61. Examples of cargo which can be secured in this manner include bicycle frames, or sections of bicycle wheels. Also in this view, a directional arrow 63 shows a direction in which cargo support element 62 can be shortened by using a telescoping mechanism. Further in this view, a directional arrow 64 illustrates an example direction of rotation of stanchion 17 into the hollow sections of the lower vertical element 73, 74 (see also FIG. 3C).

FIGS. 3G, 3H, 3I and 3J depict a strap holder unit 66, which can be used in place of one or more space holders 61 in order to secure cargo to the transport apparatus.

Figures 3G, 3H:
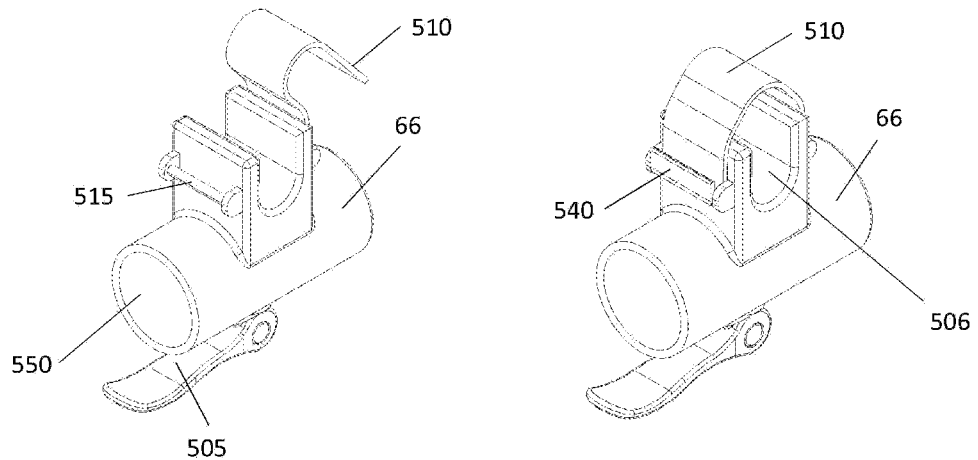
FIGS. 3G through 3J show an embodiment in which strap holder units are usable to secure cargo.

FIG. 3G shows a strap holder unit 66, which comprises a flexible strap 510, a strap retaining member 515, a locking lever 505, and an empty space 550 into which a cargo support element 62 (not shown) can be inserted and removed. This allows one or more strap holder units 66 to be slid onto, and off of, a cargo support element 62.

FIG. 3H shows strap holder unit 66, where flexible strap 510 has been positioned over a cargo space 506 and where flexible strap 510 is being held in place by a clasp 540. The cargo space 506, which is surrounded after the flexible strap 510 has been closed, is adapted to securely hold cargo such as bicycle frames or sections of bicycle wheels.

Figure 3I:
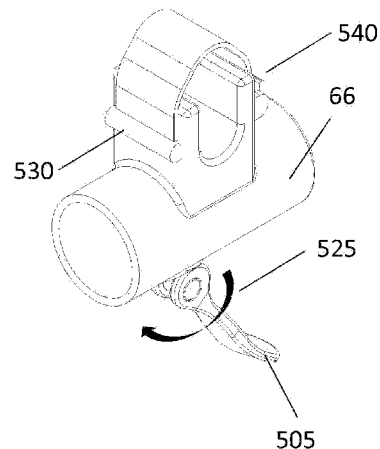

FIG. 3I shows a rear perspective view of strap holder unit 66, where a strap origin 530 is visible in the foreground and clasp 540 is now partially visible on an opposite side. Directional arrow 525 shows how locking lever 505 can be rotated into a locked configuration, which secures strap holder unit 66 in a particular longitudinal position along cargo support element 62 (not shown).

Figure 3J:
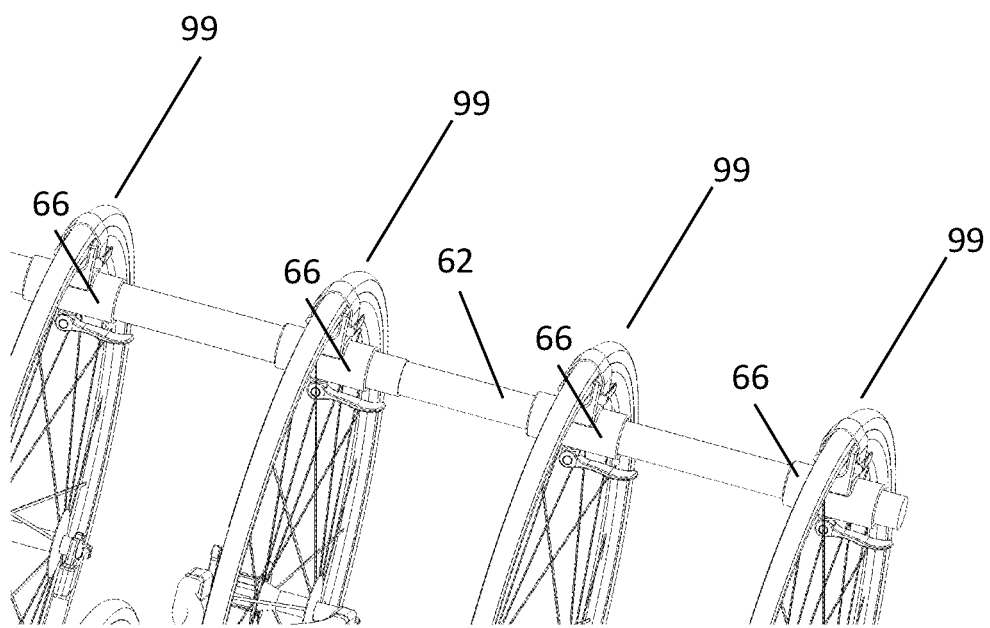

FIG. 3J shows a cargo support element 62 on the transport apparatus 10. This view depicts four bicycles 99, which have been secured by using four strap holder elements 66.

Figure 4A:
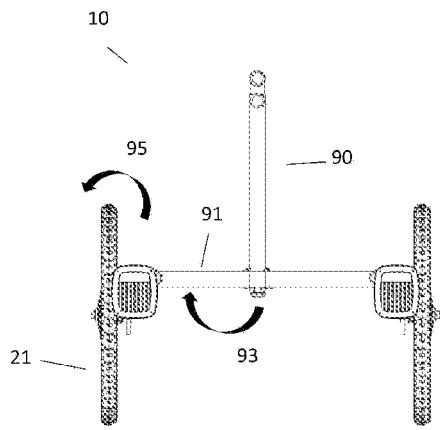
FIGS. 4A through 4E show how the invention can be rotationally collapsed.

FIG. 4A shows a rear view of transport apparatus 10. In this view, the transport apparatus has been collapsed as shown in FIGS. 3A through 3D. Additionally, the transport apparatus 10 is adapted to collapse through rotation of left half 91 into a position which is parallel to vertical telescoping element 90, as well as simultaneous rotation of left wheel 21 which causes left wheel 21 to end up parallel to vertical telescoping element 90. In this view, arrow 93 represents a direction in which left half 91 is rotated, and arrow 95 represents a direction in which left wheel 21 is rotated.

Figure 4B:
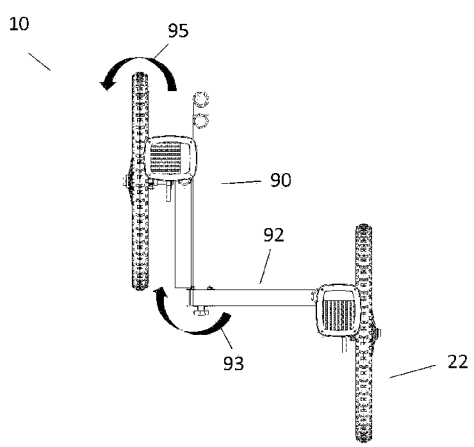

FIG. 4B shows a rear view of transport apparatus 10, where left half 91 and left wheel 21 have both been rotated in order to be parallel to vertical telescoping element 90. Arrow 93 represents the direction in which left half 91 has been rotated, and arrow 95 represents the direction in which left wheel 21 has been rotated. Here, right half 92 and right wheel 22 can be rotated (in similar fashion to left half 91 and left wheel 91) in order to end up parallel to vertical telescoping element 90.

Figure 4C:
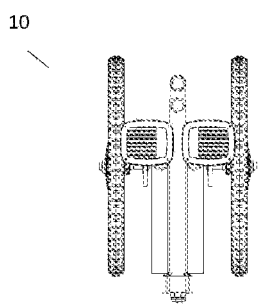

FIG. 4C shows a rear view of transport apparatus 10, where left half 91, left wheel 21, right half 92, and right wheel 22 have been rotated to be parallel to vertical telescoping element 90, and the transport apparatus 10 is now in a rotationally collapsed configuration.

Figure 4D:
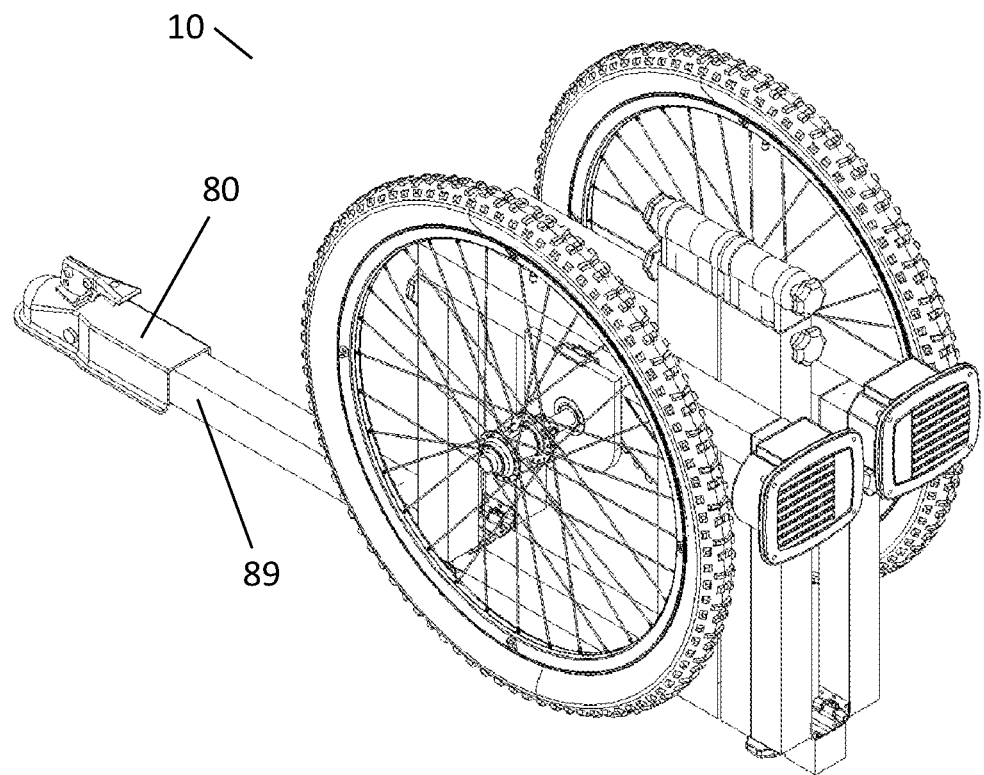

FIG. 4D shows a perspective view of the transport apparatus 10, which, as shown in FIG. 4C, has been configured into a rotationally collapsed configuration. Here, the transport apparatus 10 is adapted for further rotational collapse through rotation of hitching element 80 and hitching beam 89, as shown in subsequent figures.

Figure 4E:
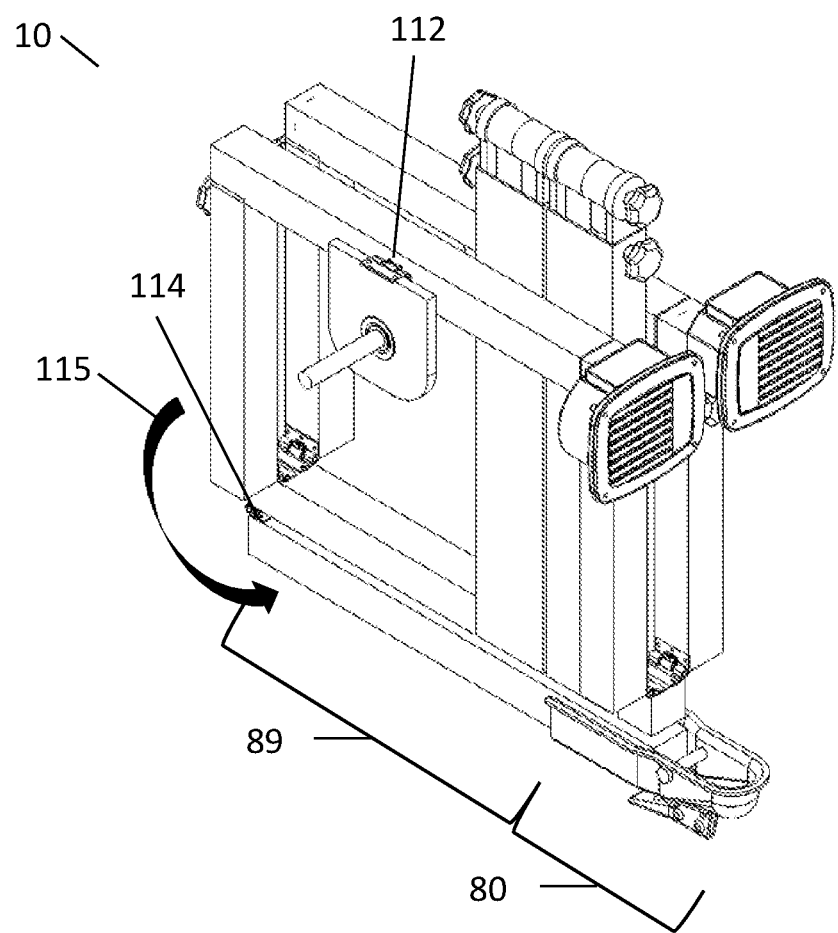

FIG. 4E shows a perspective view of the transport apparatus 10, with left wheel 21 and right wheel 22 having been removed to enhance visibility of other features. Visible in this view are a rotating pivot joint 112, which is adapted to allow rotation of the left wheel 21 between parallel and perpendicular positions, as shown in FIGS. 4A, 4B and 4C. Note that a similar rotating pivot joint (not shown in this view) on a right side of the transport apparatus will serve a similar function, allowing rotation of right wheel 22. This view also depicts how hitching beam 89 and its corresponding hitching element 80 have been rotated about a hitching hinge 114, as shown by directional arrow 115, placing the transport apparatus into a further rotationally collapsed configuration.

Figure 5A:
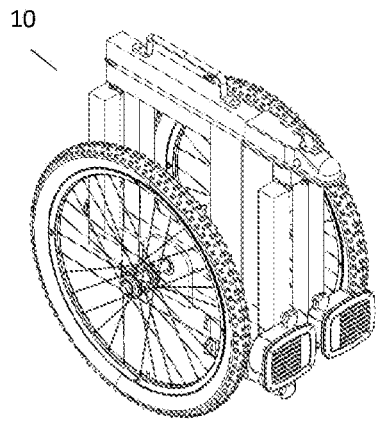
FIGS. 5A through 5C show the invention in a fully collapsed configuration, in which it can be conveniently rolled and stored.

FIG. 5A shows a perspective view of the transport apparatus 10 from FIG. 4E, after having been fully collapsed and with its left wheel 21 and right wheel 22 reattached.

Figure 5B:
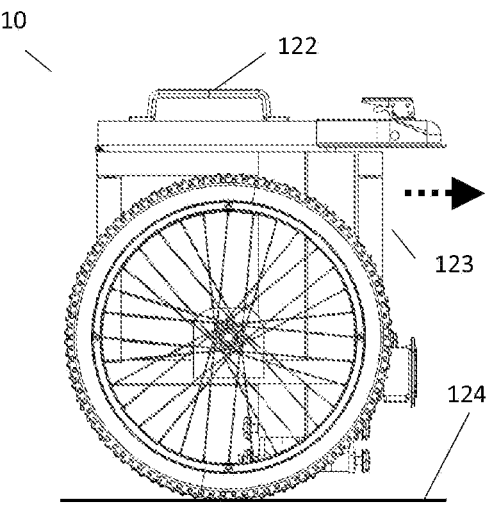

FIG. 5B shows a side view of the transport apparatus 10 after having been fully collapsed. This view depicts ground 124 and an optional top handle 122. In this configuration, the transport apparatus is capable of being pulled, pushed and/or rolled along the ground 124 as shown by directional arrow 123.

Figure 5C:
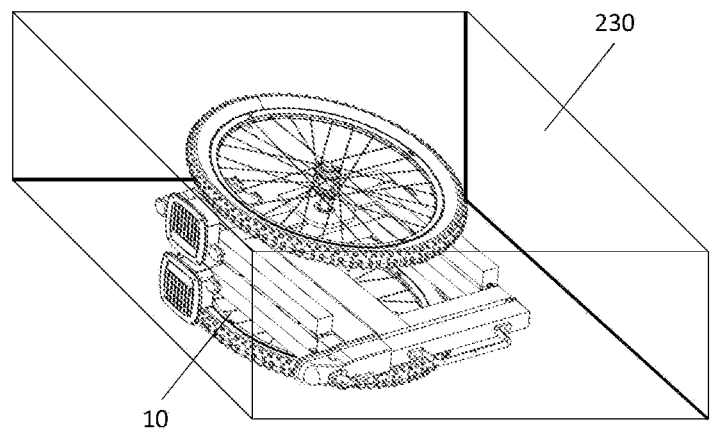

FIG. 5C shows a view of the transport apparatus 10 after having been fully collapsed and placed in a container 230. Examples of containers that the transport apparatus 10 can be placed into after collapse include, without limitation, boxes, storage units, vehicle rear seating areas, and vehicle trunks.

Figure 6A:
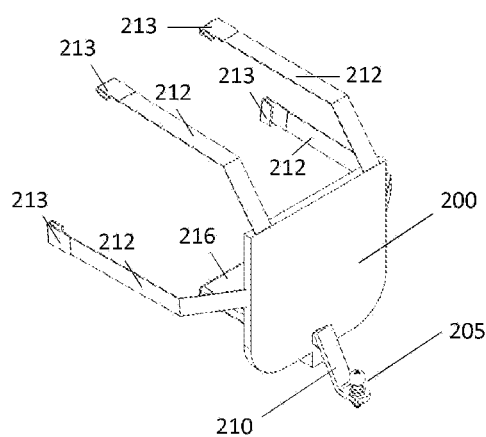
FIGS. 6A through 6C show a trailer connection attachment, which can couple a transport apparatus to a vehicle in situations where the vehicle does not have its own trailer hitch.

FIG. 6A shows a view of the trailer connection attachment 200 from FIG. 2, and depicts a ball tongue 210, a ball 205 which is adapted to interface with a standard ball hitch, a bumper interfacing element 216 which is adapted to interface with a vehicle bumper, and a bumper hook 218 (shown in subsequent figures) which is adapted to interface with a bottom section of a vehicle bumper. This view also depicts straps 212 which can be positioned partially inside a vehicle opening such as an open car door, open car trunk, open sport utility vehicle (SUV) rear hatch, and so on. The straps 212 might comprise ends which comprise hooked elements 213. The straps 212 can be secured by closing the vehicle opening after partially inserting the straps 212, and/or can also be secured by positioning the hooked elements 213 on edges of a vehicle door, hatch, or trunk before closing it.

Figure 6B:
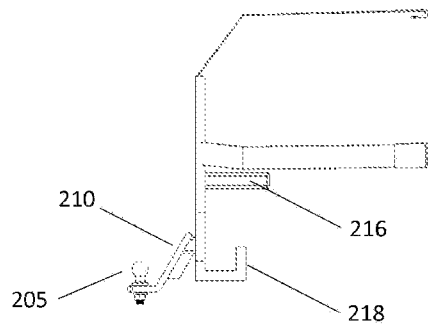

FIG. 6B shows a side view of the trailer connection attachment 200, and depicts side views of ball 205, ball tongue 210, bumper interfacing element 216, and bumper hook 218.

Figure 6C:
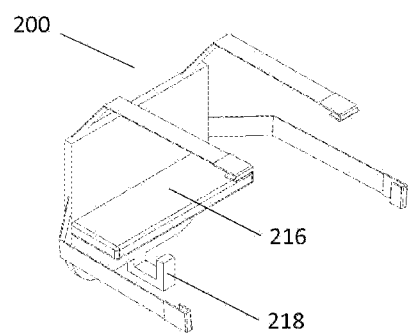

FIG. 6C shows a perspective view of the trailer connection attachment 200, showing a bumper interfacing element 216 and a bumper hook 218.

I claim:

1. A collapsible trailer for use with a vehicle, comprising:
   a front horizontal telescoping frame member;
   a rear horizontal telescoping frame member;
   a left fore-aft telescoping frame member coupled between the front and rear horizontal telescoping frame members;
   an intermediate fore-aft telescoping frame member coupled between the front and rear horizontal telescoping frame members;
   a right fore-aft telescoping frame member coupled between the front and rear horizontal telescoping frame members;
   a pair of vertical frame members coupled to the intermediate fore-aft telescoping frame member; and
   a stanchion coupled to the vertical frame member and configured to support cargo thereon.

2. The collapsible trailer of claim 1, wherein the left, intermediate, and right fore-aft telescoping frame members are telescopically movable between (i) a deployed position such that the front and rear horizontal telescoping frame members are moved away from each other, and (ii) a collapsed position such that the front and rear horizontal telescoping frame members are moved towards each other.

3. The collapsible trailer of claim 1, wherein the front and rear horizontal telescoping frame members are telescopically movable between (i) a deployed position where the left fore-aft telescoping frame member is moved away from the intermediate fore-aft telescoping frame member, and (ii) a collapsed position where the left fore-aft telescoping frame member is moved toward the intermediate fore-aft telescoping frame member.

4. The collapsible trailer of claim 1, wherein the front and rear horizontal telescoping frame members are telescopically movable between (i) a deployed position where the right fore-aft telescoping frame member is moved away from the intermediate fore-aft telescoping frame member, and (ii) a collapsed position where the right fore-aft telescoping frame member is moved toward the intermediate fore-aft telescoping frame member.

5. The collapsible trailer of claim 1, wherein the front horizontal telescoping frame member includes:
   a left-front telescoping frame member rotatably coupled to the intermediate fore-aft telescoping frame member; and
   a right-front telescoping frame member rotatably coupled to the intermediate fore-aft telescoping frame member.

6. The collapsible trailer of claim 5, wherein the rear horizontal telescoping frame member includes:
   a left-rear telescoping frame member rotatably coupled to the intermediate fore-aft telescoping frame member; and
   a right-rear telescoping frame member rotatably coupled to the intermediate fore-aft telescoping frame member.

7. The collapsible trailer of claim 6, wherein the left-front and left-rear telescoping frame members are rotatable upwards into a vertical position such that the left fore-aft telescoping frame member is rotated upwards and towards the vertical frame members.

8. The collapsible trailer of claim 7, further comprising a pivotable wheel coupled to the left fore-aft telescoping frame member by a pivot joint,
   wherein when the left-front and left-rear telescoping frame members are rotated to the vertical position, the wheel is rotatable via the pivot joint to be substantially parallel to the vertical frame members.

9. The collapsible trailer of claim 7, wherein the right-front and right-rear telescoping frame members are rotatable upwards into a vertical position such that the right fore-aft telescoping frame member is rotated upwards and towards the vertical frame member.

10. The collapsible trailer of claim 9, further comprising:
    a pivotable wheel coupled to the right fore-aft telescoping frame member by the pivot joint, and
    wherein when the right-front and right-rear telescoping frame members are rotated to the vertical position, the wheel is rotatable via the pivot joint to be substantially parallel to the vertical frame members.

11. The collapsible trailer of claim 1, further comprising:
    a forward frame member coupled to the intermediate fore-aft telescoping frame member and including a trailer coupler configured to removably couple to a vehicle.

12. The collapsible trailer of claim 11, including a pivot joint, and wherein the forward frame member is pivotally coupled to the intermediate fore-aft telescoping frame member via a pivot joint such that the forward frame member is rotatable rearward onto the intermediate fore-aft telescoping frame member when in a collapsed position.

13. The collapsible trailer of claim 1, wherein the vertical frame members each include:
    a lower vertical frame member coupled to the intermediate fore-aft telescoping frame member; and
    an upper vertical frame member telescopically coupled to the lower vertical frame member.

14. The collapsible trailer of claim 13, wherein the upper vertical frame member is movable between (i) a lowered position where the upper vertical frame member is nested within the lower vertical frame member, and (ii) a raised position where the upper vertical frame member is disposed above the lower vertical frame member to support cargo.

15. The collapsible trailer of claim 14, wherein the stanchion is rotatably coupled to an upper end of one of the upper vertical frame members.

16. The collapsible trailer of claim 15, wherein the stanchion is rotatable between (i) a deployed position substantially horizontal to the ground to support cargo, and (ii) a collapsed position where the stanchion is vertically nested within a hollow section of one of the upper vertical frame members.

17. The collapsible trailer of claim 1, wherein the stanchion includes a cargo support bar and at least one cargo holder device configured to removably couple to the cargo support bar to secure cargo thereto.

18. The collapsible trailer of claim 17, wherein each cargo holder device comprises:
   an arcuate bar with opposed first and second ends;
   a first aperture formed in the first end;
   a second aperture formed in the second end; and
   a cargo support bar,
   wherein the cargo holder device is configured to be placed about the cargo and subsequently attached to the cargo support bar by inserting the cargo support bar through the first and second apertures.

19. The collapsible trailer of claim 17, wherein each cargo holder device comprises:
   a tubular member configured to receive and slide over the cargo support bar;
   a locking device configured to selectively secure the tubular member on a desired location on the cargo support bar;
   a cargo support member coupled to the tubular member and including a cargo space configured to receive cargo; and
   a flexible strap having a first end coupled to the cargo support member, and a free second end configured to removably couple to the cargo support member once the cargo is disposed in the cargo space to thereby secure the cargo to the stanchion.

20. A collapsible trailer movable between a deployed position to support and transport cargo, and a collapsed position for storage, the collapsible trailer comprising:
   a pair of horizontal frame members;
   a pair of outboard fore-aft frame members each coupled between the horizontal frame members;
   an intermediate fore-aft frame member coupled between the horizontal frame members and disposed between the pair of outboard fore-aft frame members;
   a vertical frame member coupled to the intermediate fore-aft frame member and including a lower vertical frame member and an upper vertical frame member; and
   first and second stanchions rotatably coupled to the upper vertical frame member,
   wherein the horizontal frame members are telescopically collapsible towards the intermediate fore-aft frame member such that the outboard fore-aft frame members are moved towards the intermediate fore-aft frame member,
   wherein the outboard fore-aft frame members and the intermediate fore-aft frame member are each telescopically collapsible such that the horizontal frame members are moved towards each other,
   wherein the horizontal frame members are foldable to a vertical position,
   wherein the first and second stanchions are movable between a horizontal position to support the cargo, and a collapsed vertical position nested within a hollow section of the upper vertical frame member, and
   wherein the upper vertical frame member is telescopically collapsible within the lower vertical frame member.

* * * * *